(12) United States Patent
Pyhälammi et al.

(10) Patent No.: US 9,830,617 B2
(45) Date of Patent: Nov. 28, 2017

(54) ADVERTISING BASED ON WIDGETS

(71) Applicant: Nokia Corporation, Espoo (FI)

(72) Inventors: Seppo Pyhälammi, Helsinki (FI); Kaj Häggman, Espoo (FI); Tero-Markus Saarimaa, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 369 days.

(21) Appl. No.: 14/678,306

(22) Filed: Apr. 3, 2015

(65) Prior Publication Data
US 2015/0213494 A1 Jul. 30, 2015

Related U.S. Application Data

(63) Continuation of application No. 11/454,919, filed on Jun. 19, 2006, now Pat. No. 9,002,726.

(51) Int. Cl.
| | |
|---|---|
| *G06Q 30/02* | (2012.01) |
| *G06Q 30/00* | (2012.01) |
| *G06F 3/0484* | (2013.01) |
| *G06F 17/30* | (2006.01) |

(52) U.S. Cl.
CPC ..... *G06Q 30/0257* (2013.01); *G06F 3/04842* (2013.01); *G06F 17/30876* (2013.01); *G06Q 30/00* (2013.01); *G06Q 30/0261* (2013.01); *G06Q 30/0267* (2013.01); *G06Q 30/0269* (2013.01)

(58) Field of Classification Search
None
See application file for complete search history.

(56) References Cited

U.S. PATENT DOCUMENTS

| | | |
|---|---|---|
| 6,144,984 A | 11/2000 | DeBenedictis et al. |
| 7,103,563 B1 | 9/2006 | Voisin et al. |
| 7,376,907 B2 | 5/2008 | Santoro et al. |
| 7,467,356 B2 | 12/2008 | Gettman et al. |
| 7,610,233 B1 | 10/2009 | Leong et al. |
| 2005/0055306 A1 | 3/2005 | Miller et al. |

(Continued)

FOREIGN PATENT DOCUMENTS

EP    1 524 611 A2    4/2005

OTHER PUBLICATIONS

Chinese Office Action, Decision of Rejection, for related Chinese Patent Application No. 20780030108.3 dated Feb. 14, 2012, pp. 1-9.

(Continued)

*Primary Examiner* — Colleen Hoar
(74) *Attorney, Agent, or Firm* — Alston & Bird LLP

(57) ABSTRACT

Electronic advertisements and other types of electronic information are distributed based on user profiles and in particular, collections of widgets. User profiles may be generated based on a combination of user entered information and information inferred or derived from user behavior and interaction patterns. The use and collection of various widgets may also be recorded by a user profile to determine a user's preferences and interests. An advertisement may be distributed by segmenting a user population according to user profile information and one or more attributes of the advertisement. Users may further interact with the widgets in a variety of ways including requesting additional information about the advertised product or service and/or requesting communications with an advertiser without compromising their privacy.

20 Claims, 14 Drawing Sheets

(56) References Cited

U.S. PATENT DOCUMENTS

2006/0047704 A1 3/2006 Gopalakrishnan
2006/0288000 A1 12/2006 Gupta

OTHER PUBLICATIONS

Chinese Office Action for corresponding CN Application No. 200780030108.3 dated Feb. 10, 2011, pp. 1-7.
Google, Inc. Google Adsense, *Google Builds World's Largest Advertising and Search Monetization Program* "Company introduces automate content-targeted ads; Advertising customer base surpasses 100,000", Mar. 4, 2003, http://www.google.com/adsense/.
International Preliminary Report on Patentability for International Application No. PCT/IB2007/001324 dated Jan. 8, 2009, 7 pages.
Office Action for U.S. Appl. No. 11/454,919 dated Sep. 9, 2010.
Office Action for U.S. Appl. No. 11/454,919 dated Mar. 31, 2011.
Notice of Allowance for U.S. Appl. No. 11/454,919 dated Dec. 5, 2014.
Office Action for India Appl. No. 10649/DELNP/2008 dated Feb. 17, 2015.

User Profile: Joe Smith — 401

Age: 23
Gender: Male
Citizenship: United States of America
Residence: New York, New York
Income: $35,000
Interests: Sports, Music
Advertisement & Widget Collection:
NFL Advertisement Widget
Concert & Music Widget
NCAA Basketball Widget

User Profile: Emily Smith — 402

Age: 35
Gender: Female
Citizenship: France
Residence: Washington, D.C.
Income: $75,000
Interests: Theater, Opera, History
Advertisement & Widget Collection:
Broadway Advertisement Widget
Concert and Music Widget
History Channel Widget

FIG. 4

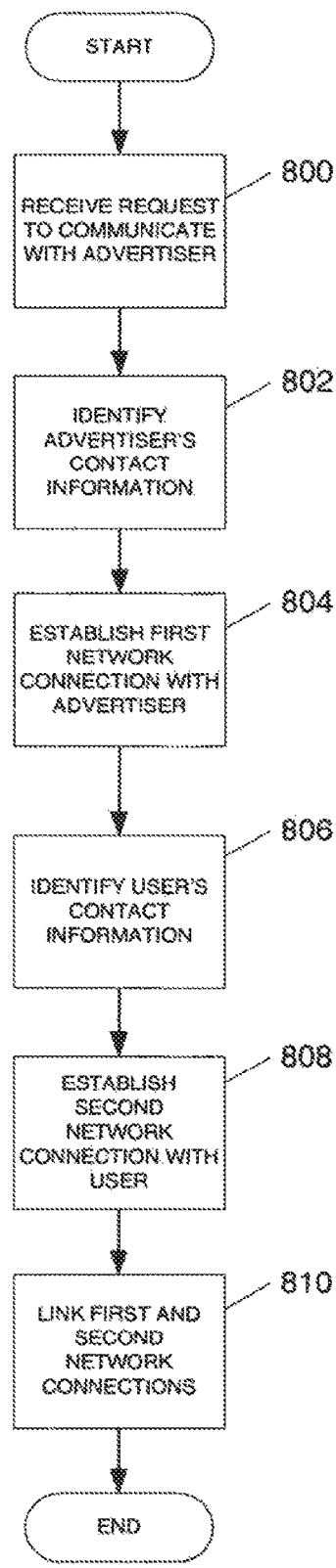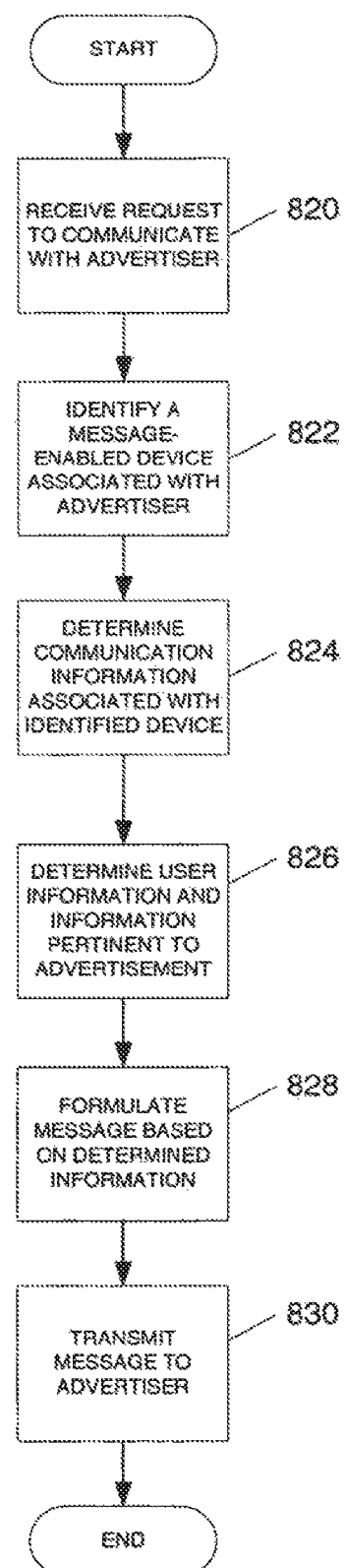
FIG. 8A
FIG. 8B

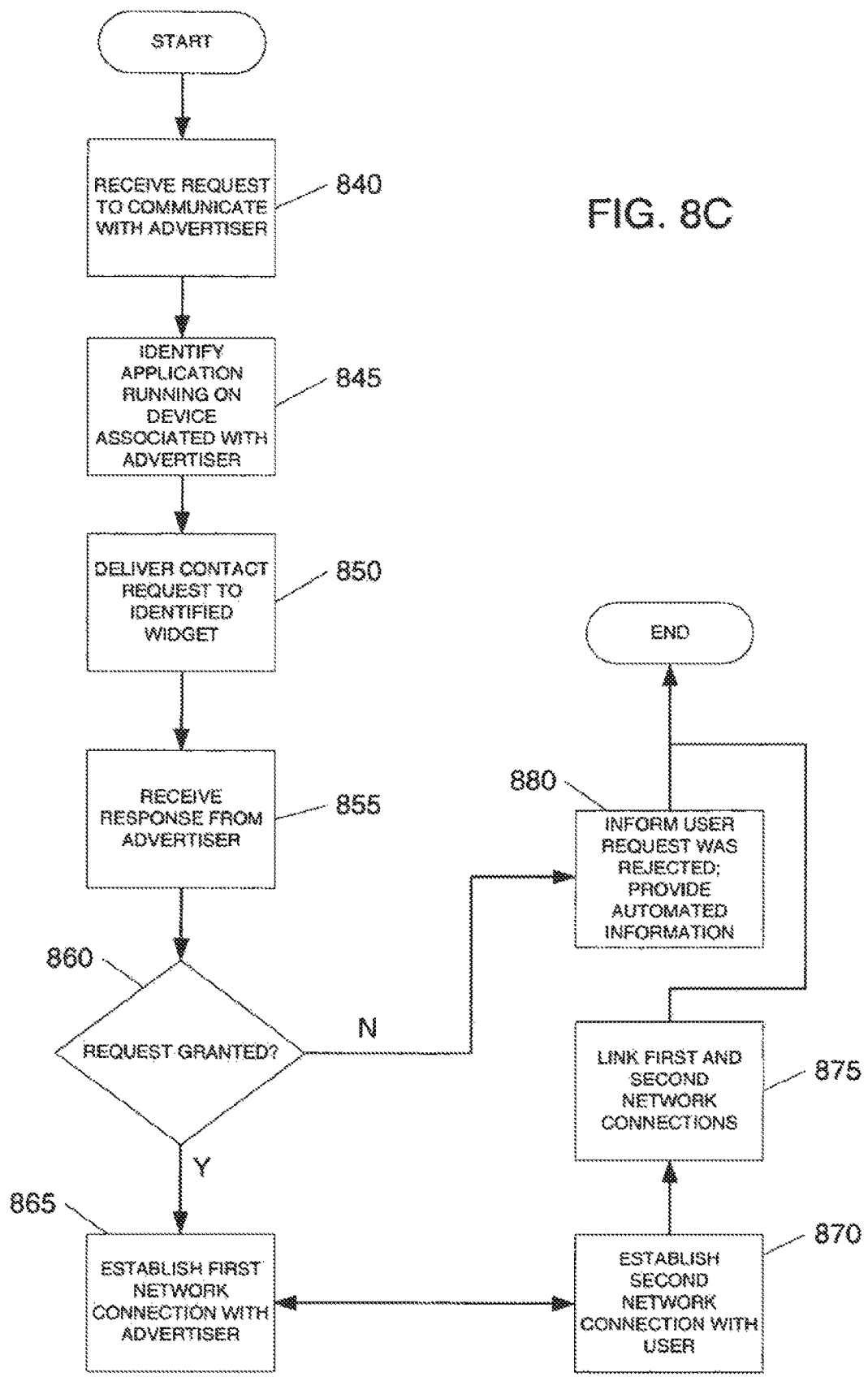

ADVERTISING BASED ON WIDGETS

CROSS REFERENCE TO RELATED APPLICATION

This application is a continuation of and claims priority to U.S. application Ser. No. 11/454,919, filed Jun. 19, 2006, and entitled, "ADVERTISING BASED ON WIDGETS," the entire contents of which are hereby incorporated by reference.

FIELD OF THE INVENTION

The invention relates generally to a method and a system for distributing electronic information. Specifically, the invention relates to providing advertising information and interactive options to a user.

BACKGROUND OF THE INVENTION

The process and science of information distribution is heavily relied upon by many industries including the advertising industry. Advertisers seek to distribute their advertisements and information to as many people as possible that may be interested in their product. This typically involves analyzing user profile information to determine whether the benefit of sending the advertisement to users would outweigh the costs. In some instances, advertisements are specifically geared toward one demographic and thus, may be ineffective for another demographic. As such, advertisers must insure that costs are not incurred to advertise with those demographics that are not relevant to a particular advertisement. Electronic advertising has also developed into a key component of many marketing campaigns, because electronic advertising can often be low cost and easily distributed to numerous users at once.

In addition, creative electronic advertising methods such as the use of advertisement widgets have allowed advertisers and target users to strike a balance in the control of advertisement distribution. Advertisement widgets are applications that may be downloaded to a user's computing device such as a mobile phone and that display a variety of information including advertisements. Widgets include graphical elements that are generally displayed in a particular area of a device's user interface. Widgets may further be associated with a content server and receive display content directly from the server based on various factors including user preferences and interests. For example, YAHOO!® provides a widget engine that allows a user to run widgets that may perform a multitude of actions and functions.

Even with new developments in advertising technology like the use of widgets, advertisers may often find it difficult to target the most relevant user groups and/or to identify those users who would be receptive to advertisements. Advertisers have not been able to capitalize on information about a particular user inferred from user interactions and behaviors. For example, a user may frequently download and view advertisement widgets relating to consumer electronics. In particular, the user may have a significant collection of widgets relating to electronics. Based on this observation, an advertiser of televisions would most likely want to direct an advertisement to that user. However, the advertiser is often unaware of such behavior, patterns and widget collection information. In addition, many users are often hesitant to sign up for advertisements or use advertisement widgets because they assume their private information (e.g., e-mail address, home telephone number) will be distributed to other advertisers. Further, even when a user is interested in an advertised product, they are often guarded about signing up for additional information for fear of compromising their privacy.

For the foregoing reasons, a system and method of enhancing electronic advertising and information distribution is needed.

SUMMARY OF THE INVENTION

Many of the aforementioned problems are solved by providing a method and system that enhances segmentation of a user population for advertising and other information distribution purposes and that improves the protection of a user's privacy. For example, users of mobile communication devices may represent an attractive user population to which companies may want to advertise. To that end, a user profile may be generated for each user in the mobile terminal user population to track and record user behavior and record the types of advertisements and advertisement widgets a user collects on his or her mobile terminal. A user profile may further record how frequently a user interacts with a particular type of advertisement or advertisement widget. The user profile information may then be used by a server to segment the user population in accordance with one or more target parameters of a particular advertisement. Thus, advertisements may be distributed based not only on user defined information, but also on information learned from user interaction and use patterns and preferences. In one example, a user who frequently downloads advertisements or advertisement widgets relating to movies may be a target user for an advertiser associated with a movie studio.

The protection of a user's privacy is also enhanced by allowing a user to request additional information without providing private information. A server may facilitate this process by receiving a request for additional information from a user and relaying the request to the advertiser. Upon receiving the additional information, the server transmits the additional information to the user at a predefined contact address or location. The server requests the additional information anonymously (i.e., without revealing the user's identity) and does not reveal the predefined contact information to the advertiser. In addition, the user may request communication with the advertiser without providing contact information. Communication may be established between an advertiser and a requesting user through a server that acts as a communication link. The user may request such communications through an advertisement or an advertisement widget.

In another aspect, cost and market permeation estimates may be generated for an advertiser prior to the advertiser submitting an advertisement for distribution. This allows an advertiser to more accurately estimate the effectiveness of a particular marketing campaign prior to committing to the campaign. In addition, advertisers may preview the segment or segments to which an advertisement will be distributed and modify the advertisement if the segments do not meet the advertiser's needs.

In yet another aspect, market permeation may be increased by offering incentives to users to receive and view advertisements. For example, an advertisement server may request advertising access to a user's device. In exchange, the server or service may discount certain communication services provided by the user's service provider. Alternatively, an advertising service may offer additional discounts for advertisements if the user registers.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIG. 4 illustrates two user profiles associated with two users according to one or more aspects described herein.

FIGS. 8A, 8B and 8C are flowcharts each illustrating a method for handling a clickto-call selection according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
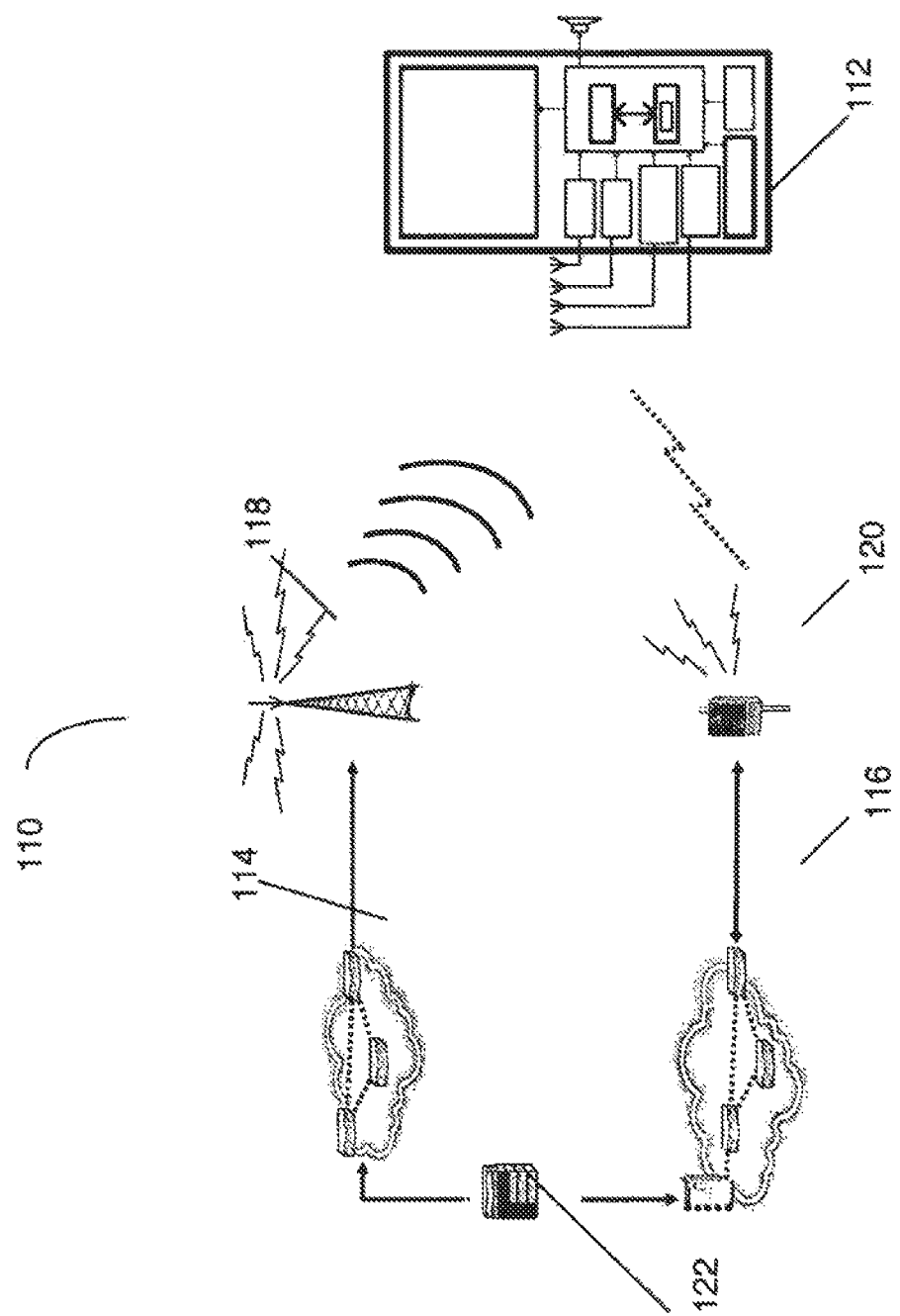
FIG. 1 illustrates a block diagram of a wireless communication system in which various embodiments may be implemented.

Aspects of the present invention may be utilized across a broad array of networks and communication protocols. FIG. 1 illustrates an example of a wireless communication system 110 in which systems and methods according to at least some embodiments may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 (which may include the internet or similar network) and/or cellular network 116. The mobile terminal/device 112 may comprise a digital broadband broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, may be incorporated into the TS. This enables a receiver device to correctly process the data contained within the TS.

Aspects of the present invention, however, are also is applicable to other traditional digital mobile broadcast systems such as, for example, T-DAB, T/S-DMB, ISDB-T, ATSC, MediaFLO, and non-traditional systems such 3GPP MBMS and 3 GPP2B CMC S.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116 or utilizing both networks.

The mobile device 112 may also contact the service source 122 through the cellular network 116. The cellular network 116 may comprise a wireless network and a base transceiver station transmitter 120. The cellular network may include a second/thirdgeneration (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user input or selection (for example, in an interactive transmission), applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
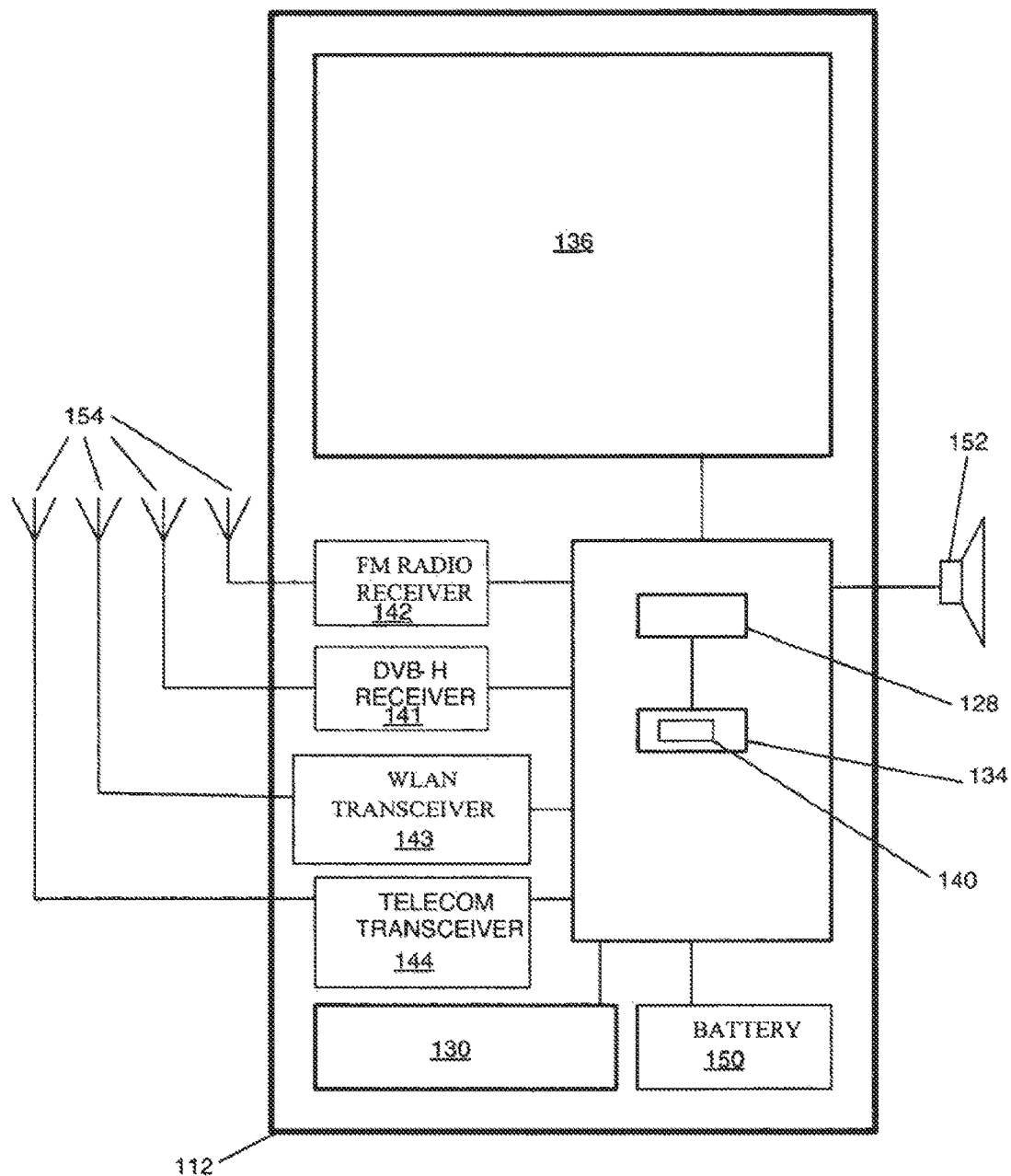
FIG. 2 illustrates a suitable digital broadcast receiver in which one or more illustrative embodiments may be implemented.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, stylus, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of the computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H, DVB-T or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation. The power of receiver between bursts may be turned off to reduce power consumption.

In one or more configurations, a user of a mobile device may input desired data into the mobile device, organize the data within the mobile device, or display the information in a convenient manner. For example, a system for providing desired information in a mobile device may include a system API through which a third party may provide content to the mobile device. In addition, the system may include a widget API for providing a standardized interface for communication between a user interface display element (i.e., a widget) containing or displaying desired information. A widget, as used herein, relates to a user interface element and/or application that provides information such as advertising or weather information to a user based on a variety of factors such as user preferences. The system API may communicate with the widget via the widget API, for example. Also, the widget may access information on the Internet via the widget API. The widget may also include one or more web applications that are linked to one or more web servers and that access, send and/or retrieve information without relying on a web browser.

Widgets may be arranged and displayed on a dashboard located in a particular area of the user interface. A dashboard, as used throughout, refers to a predefined area of the user interface in which one or more widgets may be placed and organized. The dashboard provides delivery of messages from the widget API to the service or web server. The dashboard may further include a dashboard API for providing access to mobile device resources and for presenting a user interface corresponding to a widget. The dashboard API may contain at least two parts. One part may be an API for the development of widgets such as design, placement on a display, content, etc. Another part of the dashboard API may be provided for third party developers. In another example, the dashboard API may be built over a mobile device operating system or over any other API available on the mobile device. In another example, the system may also include a mobile gateway for creating and maintaining mobile connections between a mobile device and a service.

Widgets may be acquired in a variety of ways including through e-mail and/or by download from a widget advertiser or server. For example, an on-line business may make available an advertising widget associated with the business and allow users to download the widget to receive discounts and other offers from the business. Alternatively or additionally, an advertising company may e-mail widgets to target users. In one or more configurations, one or more users may be given an incentive to allow advertisements and advertisements widgets to be downloaded to their device such as a mobile telephone. For example, a company may offer bigger discounts through a widget advertised on their website. Thus, those users who download the company's widget will be able to take advantage of the discounts. Advertising incentive systems are discussed in further detail with respect to FIG. 12. Users may also be motivated to download a widget as a less obtrusive and controllable system for receiving desirable advertisements. Compared to other advertising methods, widgets may allow a user to control when advertisements are received and/or displayed. Users may further control when the widget is active.

Figure 3:
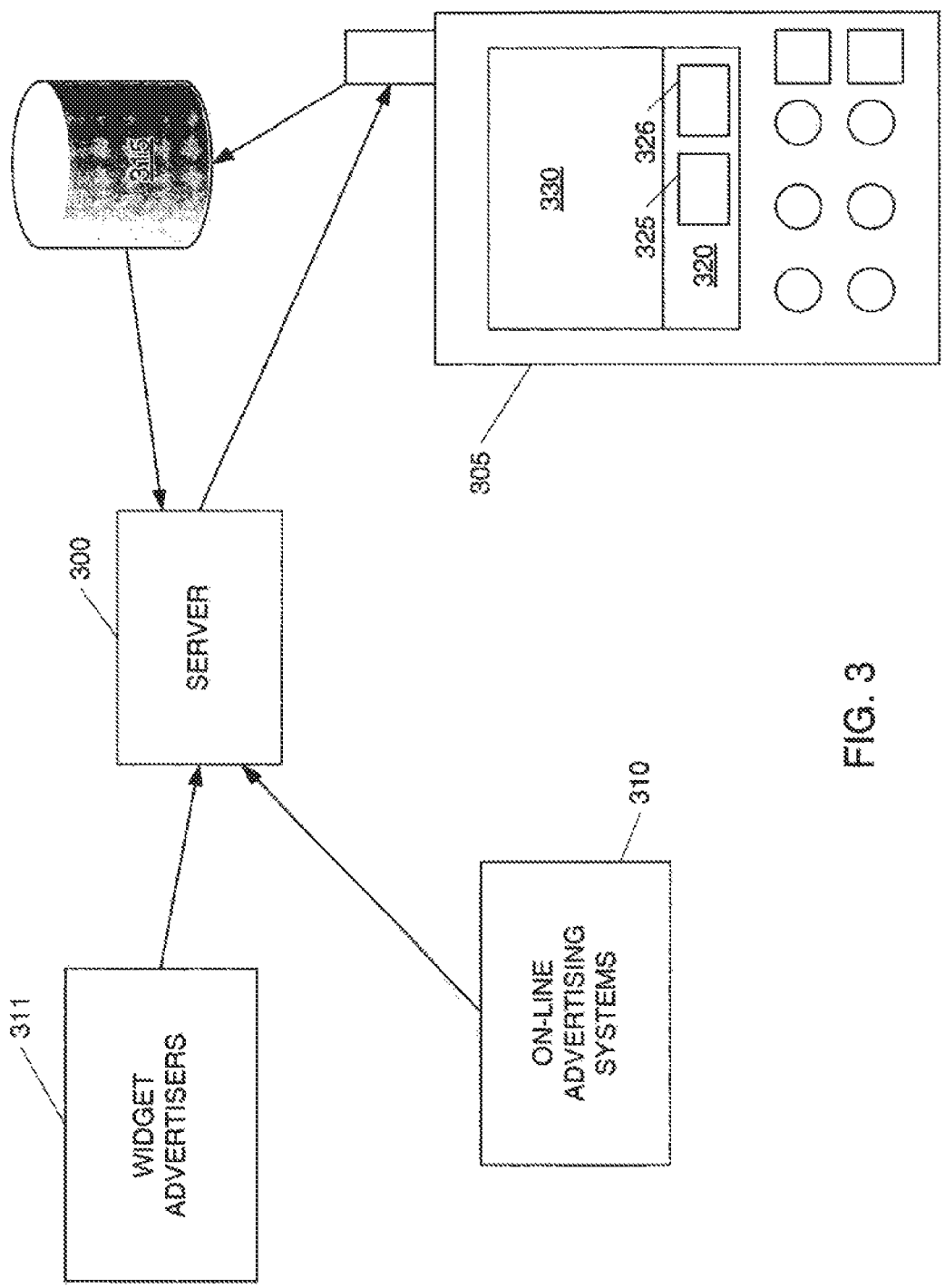
FIG. 3 is a block diagram illustrating an advertising system for sending advertisements to a mobile device according to one or more aspects described herein.

FIG. 3 is a block diagram illustrating an advertising system based on widgets that allows multiple advertising sources 310 and 311 to transmit advertisements to mobile device 305 (for example, an instance of mobile device 112). The system further includes server 300 that evaluates advertisements received from sources 310 and 311 and may deliver one or more of those received advertisements to mobile device 305. Database 315, also included in the system, stores a multitude of information including user preferences, user operation patterns and a record of a user's collection of widgets. In order to protect the privacy of users, database 315 is only accessible to server 300. Thus, server 300 may control and restrict the distribution of private user information to only user authorized entities. Various restrictions and permissions may be specified user upon registering with server 300 or an underlying system. According to aspects, server 300 may be restricted from distributing any information related to a user unless given express permission. Mobile device 305 may become associated with server 300 by a user of device 305 subscribing to server 300. Alternatively or additionally, device 305 may be associated with server 300 by a default setting pre-installed by a mobile service provider or a mobile device manufacturer. Mobile device 305 includes various components including a display screen displaying user interface 330.

User interface 330 further includes a dashboard 320 and multiple widgets 325 and 326 situated within the dashboard 320. Dashboard 320 may be defined by a fixed area of the user's interface that is dedicated to displaying one or more types of information such as widgets 325 and 326. The area occupied by dashboard 320 may be set by the user or predefined by a system default. Dashboard 320 may also be a flexible area that expands or contracts depending on the amount of information to be displayed. In instances where dashboard 320 is a fixed size, advertisements and widgets from various advertisers and companies may compete for space on a particular user's dashboard. In some cases, one spot, for example, the middle of dashboard 320, may be more desirable than a left or right position.

Each of widgets 325 and 326 are downloaded through widget server 300 based on one or more of a user request, user preferences and/or user operation patterns stored in database 315. In particular, database 315 may track and record a user's preference for certain types of advertisements or advertisement widgets to build a user profile. Specifically, widgets 325 and 326 collected by a user may be analyzed and recorded as part of the user profile. For example, a user's widget collection may contain more advertising widgets related to consumer electronics than cookware. By inferring a preference based on the user's collection of widgets, server 300 may assign higher priority to advertisements related to electronics and lower priority to cookware advertisements. The user profile is stored to allow server 300 to transmit only relevant and desired advertisements to the user. Irrelevant or unwanted advertisements may be parsed out by widget server 300 or, alternatively, may still be sent to device 300 depending on the user preferences and device settings.

Widget advertisers 311 and on-line advertising systems 310 may compete to have their advertisements transmitted to device 305. Widget advertisers 311 refer to those companies or organizations that seek to advertise widgets to users. The advertised widgets may be specific to a company and contain functionality and/or information that are particularly relevant to or indicative of the sponsoring company. On-line advertising systems 310 and vendors, on the other hand, generate advertisements for various companies and organizations and transmit the advertisements to server 300. That is, the advertisements distributed by on-line advertising systems 310 might not be relevant or linked to systems 310. Server 300 may generate an advertisement widget for the advertisements received from on-line advertising system 310 using, for example, a widget template or, alternatively, may deliver the advertising information through an advertisement widget previously downloaded to a user's device 305. As such, advertisements from on-line advertising system 310 and widget advertisers 311 compete for a user's attention and the bandwidth of device 305.

Server 300 is responsible for resolving the competition and determining which advertisements are ultimately transmitted to which users. In particular, server 300 segments the user population to determine which users receive a particular advertisement. To do so, server 300 may retrieve user information and profiles from database 315, divides the user population into segments, and determines which segments receive which advertisements or advertisement widgets. For example, server 300 may determine, based on user interaction patterns and user profile information, including widget collection data, that users in the 18-25 year old demographic living in California are disproportionately interested in advertisements related to water sports while users in the same age demographic living in New York are more interested financial information. In view of the apparent division in interests based on residence, server 300 may segment the user population according to residence and send a proportionate amount of surfing advertisements to the users living in California while advertisements relating to the stock market are more often transmitted to users residing in New York. The creation and evaluation of the aforementioned user profiles and user preferences are discussed in further detail below.

Once server 300 determines a particular advertisement is relevant to a user of device 305, the advertisement information is downloaded to and displayed on device 305. In one or more configurations, advertisements determined to be relevant to a user of device 305 are downloaded to device 305 and displayed in one of widgets 325 or 326. Server 300 may specify or designate one of widgets 325 or 326 as a system widget that downloads and displays a advertisements and advertisement information from a variety of sources selected by server 300 while other widgets are tied or linked specifically to a particular advertiser or advertising category. Alternatively, a widget stored in server 300 associated with a relevant advertisement may be downloaded to device 305 and displayed in dashboard 320. In one example, a new widget associated with advertisement information received from an on-line advertising vendor 310 may be created and downloaded to device 305 where the widget and the advertisement information is displayed in dashboard 320. Another method of displaying advertisements and related information may include displaying an advertisement on a user's device 305 through RSS streams. For example, an advertisement may be displayed as a headline in the RSS display.

FIG. 4 illustrates two user profiles containing various information about the two users including widget information. Based on the user profile information, an advertising server such as server 300 (FIG. 3) may appropriately distribute advertisements that are received from on-line advertising systems and widget advertisers to one or more users. Each profile 401 and 402 stores a name, age, gender, citizen, residence and income of the user. In addition, profiles 401 and 402 also include user interests and identify each user's collection of widgets and advertisements that a user currently uses or previously used in his or her mobile device. In profile 401, for example, user Joe Smith is identified as being 23 years old from New York, N.Y. with interests such as sports and music. In addition, profile 401 also reveals that Joe Smith maintains a collection of widgets that includes widgets related to the NFL, Concerts and NCAA basketball. Profile 402, on the other hand, indicates that user Emily Smith is a 35 year old citizen of France who earns a yearly income of $75,000. Further, Emily has a collection of widgets that includes Concerts and Off-Broadway widgets as well as a widget associated with the History Channel. Based on these differing user profiles 401 and 402 and depending on the subject matter of a received advertisement, the users corresponding to profiles 401 and 402 may be segmented in different groups.

In one or more scenarios, a server may group the users corresponding to profiles 401 and 402 together based on the type of advertisement. For example, both profile 401 and 402 indicate that both users have widgets associated with music and in particular, concerts, in each of their respective collections. As such, the users corresponding to profiles 401 and 402 may be grouped together in the same segment of users to which advertisements relating to music and concerts are sent. In another example, an advertisement received from a widget advertiser advertising sports memorabilia might not be transmitted to both users. Based on the user interests and the collection of widgets of each of user profiles 401 and 402, an advertising server may determine that the user of profile 402 does not belong in a sports fan segment of the user population, but that the user of profile 401 does belong in a sports fan segment. Accordingly, the sports memorabilia advertisement may be transmitted to the device associated with the user of profile 401, but not the device associated with the user of profile 402. User profiles 401 and 402 may be updated on at a regular interval defined by the user or a default setting.

Alternatively or additionally, user profiles 401 and 402 may be updated every time the users corresponding to user profiles 401 and 402 downloads or updates their collection of widgets. A user may further manually update their profile based on a change in preference or other factors. In addition to the aforementioned information, user profiles 401 and 402 may also include information such as widget usage history, Really Simple Syndication/Rich Site Summary (RSS) reader headline openings/markings, a preferred language. A plethora of other information may be similarly stored or recorded in user profiles 401 and 402. Further, user profiles 401 and 402 might not contain the same types of information. Rather the types of information stored in user profiles 401 and 402 may be specific to each of the users. In one example, user profile 401 may further include an information field named "Favorite Football Team" with an associated value of "Washington Redskins." In contrast, user profile 402 might not contain that field, but instead may include a field named "Historical Era" indicating that the user is especially interested in the Middle Ages. As such, each of user profiles 401 and 402 may contain profile information that relates specifically to a particular interest of the corresponding user, e.g., using keywords.

Figure 5:
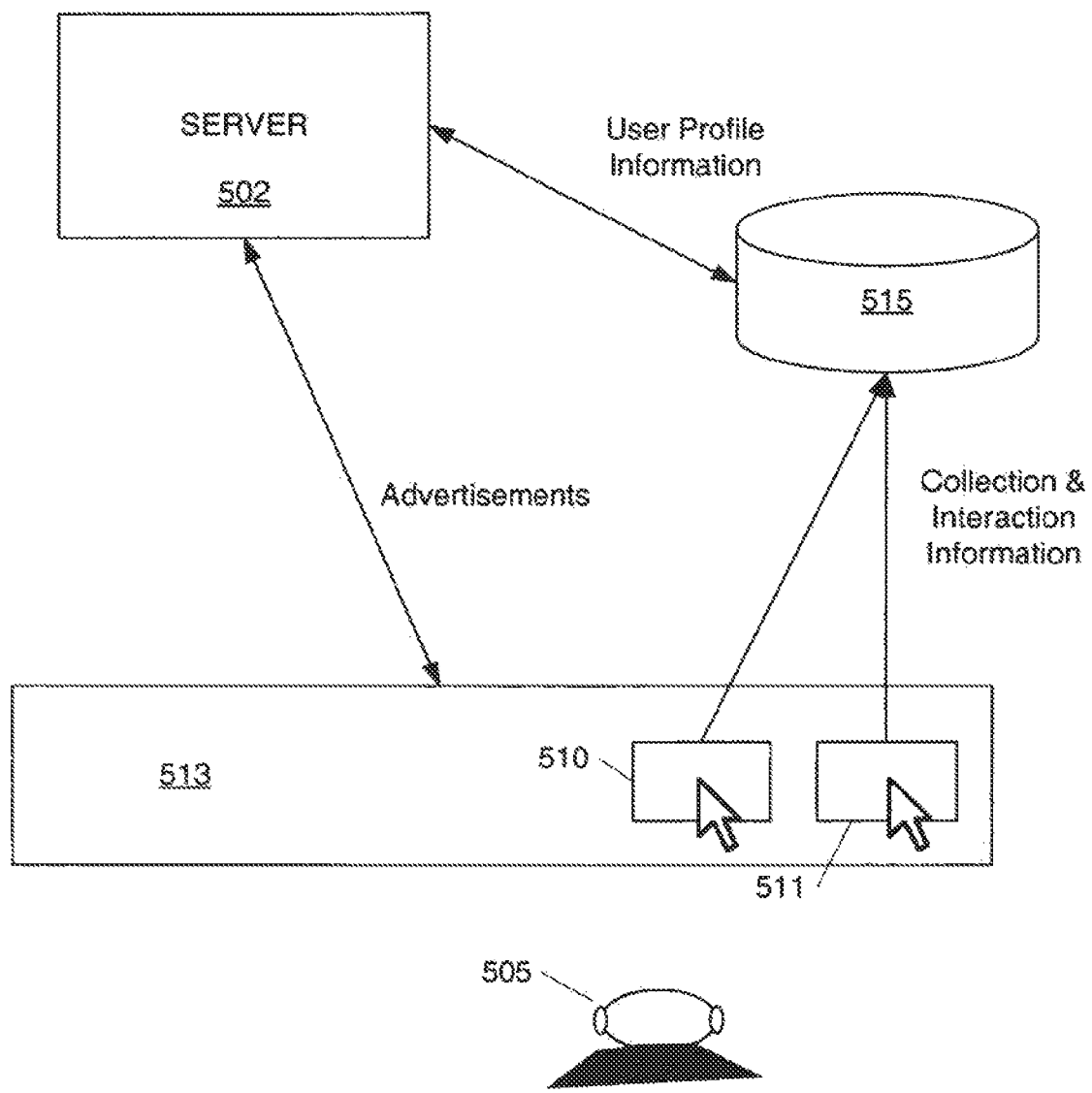
FIG. 5 is a block diagram illustrating the transmission of advertisements based on a user's interactions with one or more widgets according to one or more aspects described herein.

FIG. 5 is a block diagram illustrating user interactions with widgets 510 and 511 displayed on dashboard 513 and a system for using the interactions to match one or more advertisements to user 505. The system includes a storage structure such as database 515 that stores user profile information including user behavior and interactions and user preferences. Initially, user 505 may perform a visual inspection of both widgets 510 and 511 to evaluate the subject matter of the content associated with widgets 510 and 511. Upon determining the subject matters of each of widgets 510 and 511, user 505 may further interact with one of the widgets such as widget 511. For example, user 505 may scroll through widget 511 if the widget contains more information than is able to be displayed in the current window. In other words, a user's interaction with a particular widget such as widget 511 may reinforce the user's interest in the subject matter associated with widget 511 in the user's profile information. Other user operations may also be evaluated include a selection of one or more links included in widget 511 and/or entering information in an entry field of widget 510. In FIG. 5, user 505 selects a link contained within the information presented by widget 511. The action of selecting the link is recorded in a profile associated with user 505 and stored in database 515. User interactions and behaviors may also dictate which widgets are recorded in a user's collection of widgets stored in the user profile. That is, simply downloading widget 510 may be insufficient for widget 510 to be added to the profile information. Rather, the addition of widget 510 to a user's collection may depend on interactions and behaviors involving widget 510 and/or the frequency thereof. In addition, information associated with a link that user 505 selects may also be identified and similarly added to the user profile. For example, a selected link may direct user 505 to a particular advertiser's homepage. Accordingly, the particular advertiser may be identified in the profile of user 505. In one or more configurations, user interactions, behavior and other profile information detected by the mobile device may first be transmitted to server 502, which, in turn, may relay the information to database 515.

Using the widget collection data as well as other profile information derived from user interactions and behavior, server 502 may determine whether one or more advertisements received from a variety of sources would be relevant to the interests of user 505. That is, server 502 may determine one or more attributes of an advertisement that are of particular relevance to determining target users. The user population may then be segmented based on those attributes or characteristics. That is, whether a user is grouped into a particular segment of the user population depends on the user's collection of widgets as well as other profile information. As a user continues to develop his or user widget collection and profile information, the segmentation of the user population may change.

Widgets such as widgets 510 and 511 may be associated with a single advertisement or may be used to display and rotate multiple advertisements. For example, a widget may be generated that is specifically associated with a particular product such as a beverage. Accordingly, the widget may only displays a pre-specified advertisement associated with the advertised beverage. Alternatively, a widget may be generated that is capable of receiving and displaying multiple advertisements that may be related in subject matter or associated with the same company. In one instance, a company that sells several types of furniture products may create a single widget that is capable of displaying a rotation of advertisements relating to the various types of furniture products. Additionally, a server may generate a single advertisement widget for receiving and displaying an assortment of advertisements that the server determines are relevant to a corresponding user.

Figure 6:
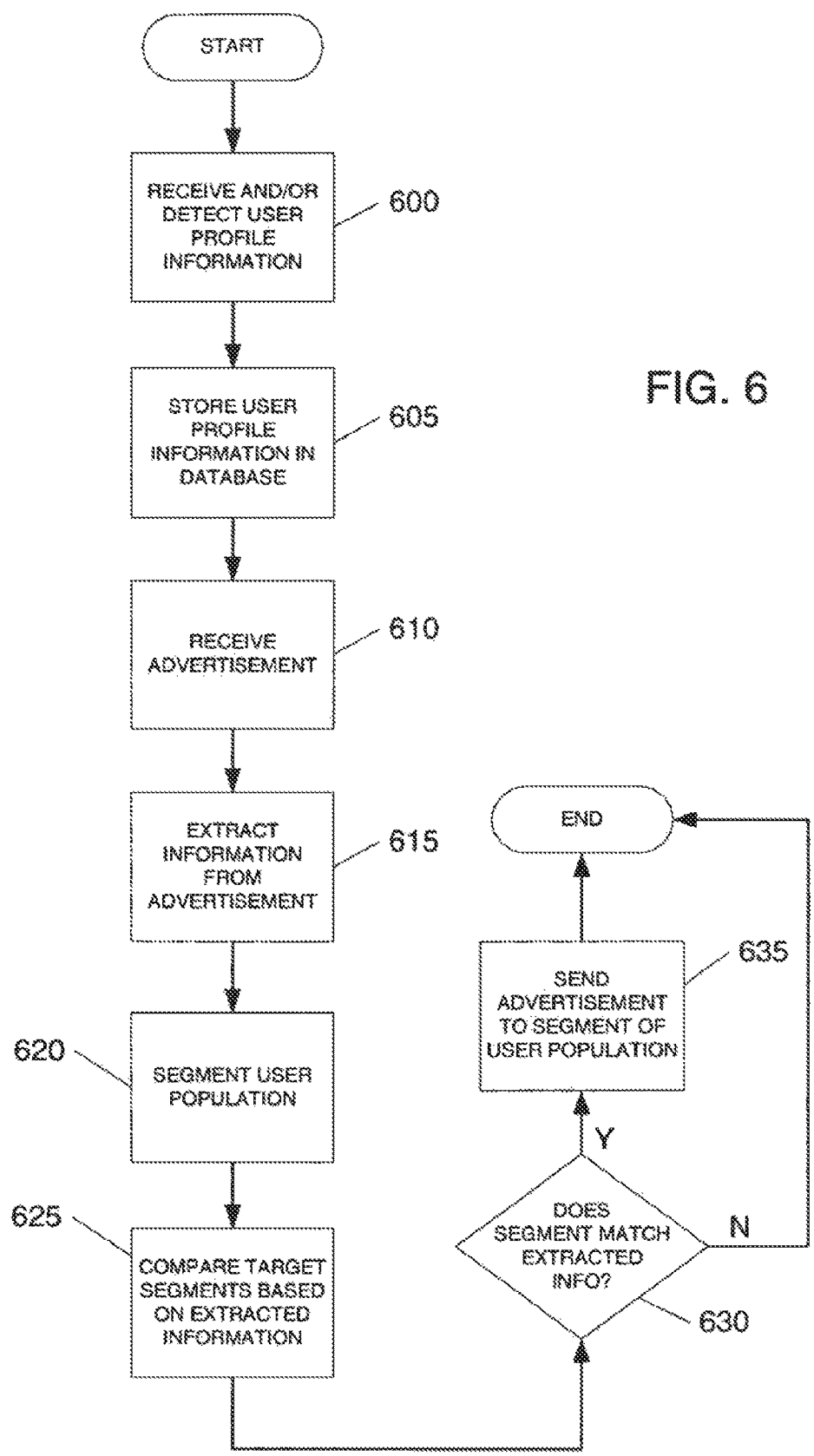
FIG. 6 is a flowchart illustrating a method for advertising based on profile information according to one or more aspects described herein.

FIG. 6 is a flowchart illustrating a method for providing relevant advertisements to a user using widgets. In step 600, a server may receive and/or detect profile information associated with a particular user. For example, the profile information may include user behavior patterns or interactions, user entered profile data and/or information relating to the user's widget collection. A user's widget collection may initially start with no widgets or, alternatively, may be initialized with one or more widgets associated with the server. For example, upon registering with a widget or advertisement server, a user may be required or asked to download one or more widgets associated with the server. In step 605, the profile information is subsequently stored in a database. The profile information may be added to a current profile that exists for the user or, alternatively, may be created anew. Various storage strategies may be used in order to ensure that profile information corresponding to the same user is properly associated. In step 610, the server receives an advertisement from an advertising source such as a widget advertiser or an advertising vendor. The server, upon receiving the advertisement, may extract one or more attributes from the advertisement that are significant in determining appropriate target users for the advertisement in step 615. Based on the extracted attributes and user profile information, a user population associated with the server may be segmented accordingly in step 620. For example, if the advertisement relates to action figures, one attribute that may be extracted is "toys." As such, the user population may be segmented according to those users that may be interested in toys and those users who are most likely not interested in toys. Interest in toys may be determined or inferred based on the users' collections of widgets. In step 625, one or more segments of the user population are matched with the extracted advertisement attribute or attributes. In one example, the server may identify that a significant attribute of an advertisement relating to a baseball jersey is the location of the team (e.g., New York for the New York Yankees). In response, the server may segment the user population according to the users' places of residence. That is, all users that reside in New York would be grouped together; all users living in Kansas would be grouped together and so on. Alternatively, the user population may be segmented according to those users residing in the New York area and users would live outside of the New York area. Upon segmenting the user population, the residence of each group is compared with the location attribute extracted from the advertisement to identify one or more matching segments in step 630. In step 635, the advertisement is subsequently transmitted to one or more users in those segments of the user population that match the identified parameters and characteristics of the advertisement. In another example, the user population may be segmented by age if the advertisement relates to a matter that users of one age group might find particularly relevant, e.g., college information.

Figure 7:
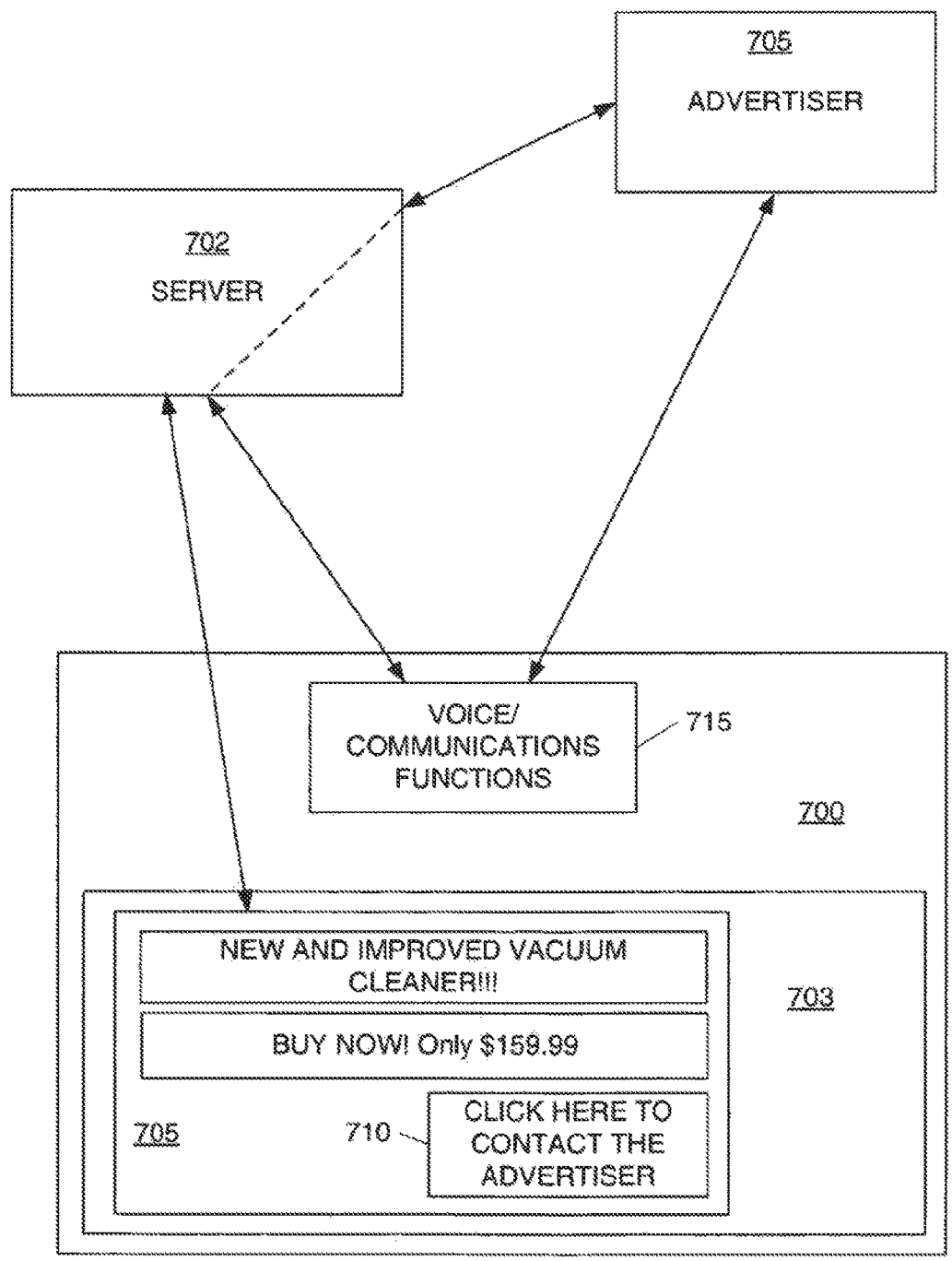
FIG. 7 is a diagram illustrating a click-to-call option included in a widget and facilitated by a server according to one or more aspects described herein.

FIG. 7 is a diagram illustrating a system for establishing communications between a user's device 700 and an advertiser 705. Advertiser 705 relays an advertisement or advertisement widget 705 to user's communication device 700 through server 702. Device 700 includes dashboard 703 in which one or more widgets including widget 705 are displayed and organized. In addition, device 700 includes voice and communication functions 715 and/or components which allow the user to communicate with another party. In one instance, a user may wish to contact an advertiser from which advertisement widget 705 originated. For example, the user may be interested in purchasing the advertised product or may wish to speak to a live customer service representative. One marketing tool that an advertiser may use is a contact option such as button 710 embedded in widget 705 that facilitates communication between a user of device 700 and advertiser 705. Upon selection button 710, communications may be established between advertiser 705 and device 700 in several ways.

In one or more configurations, selection button 710 transmits a request to server 702 requesting contact with advertiser 705. In response to the request, server 702 may establish a first communication connection with advertiser 705 and a second communication connection with device 700 (or a user thereof) and link the two communication connections. As such, server 702 also serves as a facilitator and gateway of communications. To facilitate this task, server 702 may include a conference call bridge that provides the capability to send and receive communications to and from multiple entities and/or devices. Additionally, server 702 may include a VoiceXML gateway that executes VoiceXML code allowing advertiser 705 or a user of device 700 to enter commands through speech. Thus, in one example, advertiser 705, upon receiving a call from server 702 requesting communications with a user of device 700, may reject the call using voice commands. VoiceXML code is able to translate the voice commands and perform a corresponding action (e.g., sever the connection with advertiser 705) in response.

Alternatively or additionally, advertiser 705 may also have a widget associated with server 702. Upon receiving a contact request from a user of device 700, server 702 may display the contact request to advertiser 705 through the advertiser's widget. The contact request may further include a "Call Back" or "Contact" option that allows advertiser 705 to respond to the contact request. Using this method, a user's name and phone number may be hidden from advertiser 705 and known only to server 702. Server 702 may merely displays the contact option to advertiser 705 without any additional information. Once advertiser 705 chooses to call the user back, server 702 is able to establish a connection between advertiser 705 and the user of device 700 based on information known only to server 702.

In yet another alternative or additional configuration, server 702 may transmit an SMS or e-mail to advertiser 705 identifying the user and a call-back phone number. Other forms of message communications may also be used separately or in combination with SMS and/or e-mail. Server 702 may form the SMS or e-mail based on profile information of the user, a caller identification and/or information manually provided by the user. For example, advertiser 705 may require that certain information be transmitted as part of a communication request. If the information is not available to server 702, server 702 may prompt the user for the information. In one instance, server 702 may establish a communication connection with the user of device 700 to retrieve the required information through voice commands and inputs. Alternatively, server 702 may send a SMS request the information to the user through device 700.

FIGS. 8A, 8B and 8C are flowcharts each illustrating a method for processing a user request for communications with an advertiser. In step 800 of FIG. 8A, a server initially receives a request to communicate with an advertiser. The request may be received through an advertisement widget on the user's dashboard. The advertiser may further be identified and determined based on the information associated with the advertisement widget. In addition, the advertiser's contact information is determined in step 802. In one or more configurations, the advertiser's contact information may be pre-stored in the server or a database associated therewith. Alternatively or additionally, the advertiser's information may be embedded in the advertiser's advertisement widget. In step 804, a first network connection is established with the advertiser. The network connection may include an IP telephony connection and/or a Plain Old Telephone Service (POTS) connection. A variety of other network connections may also be used to establish communications between the two parties. In step 806, the requesting user's contact information is identified. The user's contact information may be extracted from a user profile or based on caller identification information associated with the user's device. A second network connection is then established with the user using the user's contact information in step 808. Once both the first and the second network connections have been established, the two network connections may then be linked to allow the requesting user to communicate with the advertiser in step 810. According to one or more aspects, whether a second network connection is established with the requesting user and/or whether the first and second network connections are linked may be based on an acceptance or rejection of the request by the advertiser. Additionally, the order in which steps 804 and 806 are not restricted to the order shown and may, instead, be interchanged.

Referring to FIG. 8B, a communication request is received from a user in step 820. Subsequently, in step 822, a server or other system component identifies a message-enabled device associated with the advertiser. The advertiser may identify such a device when submitting advertisements or registering with the server. Message-enabled devices refer to devices which are capable of receiving text based communications such as e-mail and/or SMS message. Once the device has been identified, communication information associated with the device is determined in step 824. For example, the communication information may include an IP address, a phone number and/or an e-mail address. User information and other information pertinent to the advertisement or user is then determined in step 826 for formulating a message to be sent to the advertiser in step 828. Pertinent information may include a user's name, phone number, subject matter of the inquiry, a product to which the advertisement relates and the like. Such information may be found in a user profile or extracted from the advertisement widget associated with the advertiser. Upon formulating the message, the message is then transmitted to the advertiser in step 830 using the communication information determined in step 824. When the advertiser receives the message, the advertiser may choose to call or otherwise contact the requesting user independently of the server and advertising system. Alternatively, the advertiser may establish communications through the server.

In FIG. 8C, once the user request is received in step 840, an application stored on an advertiser's device is identified in step 845. Specifically, an advertiser may download an application such as a widget to an advertiser's device to allow an advertiser to track contact requests from advertising targets (i.e., users). A server may then deliver contact requests and information associated with the request to the contact request widget used by the advertiser in step 850. The advertiser then determines how to respond to the contact request and responds accordingly in step 855. Typically, the advertiser either grants or rejects the request, however, in some instances, the advertiser may provide other responses such as a hold request or a hold time. The response is evaluated in step 860 and, if the advertiser grants the communication request, a first network connection is established with the advertiser and a second network connection is established with the user in steps 865 and 870. The two network connections are subsequently linked in step 875 to allow the user and the advertiser to communicate directly. Alternatively or additionally, if a user's contact request is granted, an SMS or e-mail may be sent to the advertiser with the user's contact information. If, on the other hand, a user's request is denied, the requesting user is informed of the decision in step 880. A user may also be given alternative information contact methods or times if the request is denied.

Figure 9:
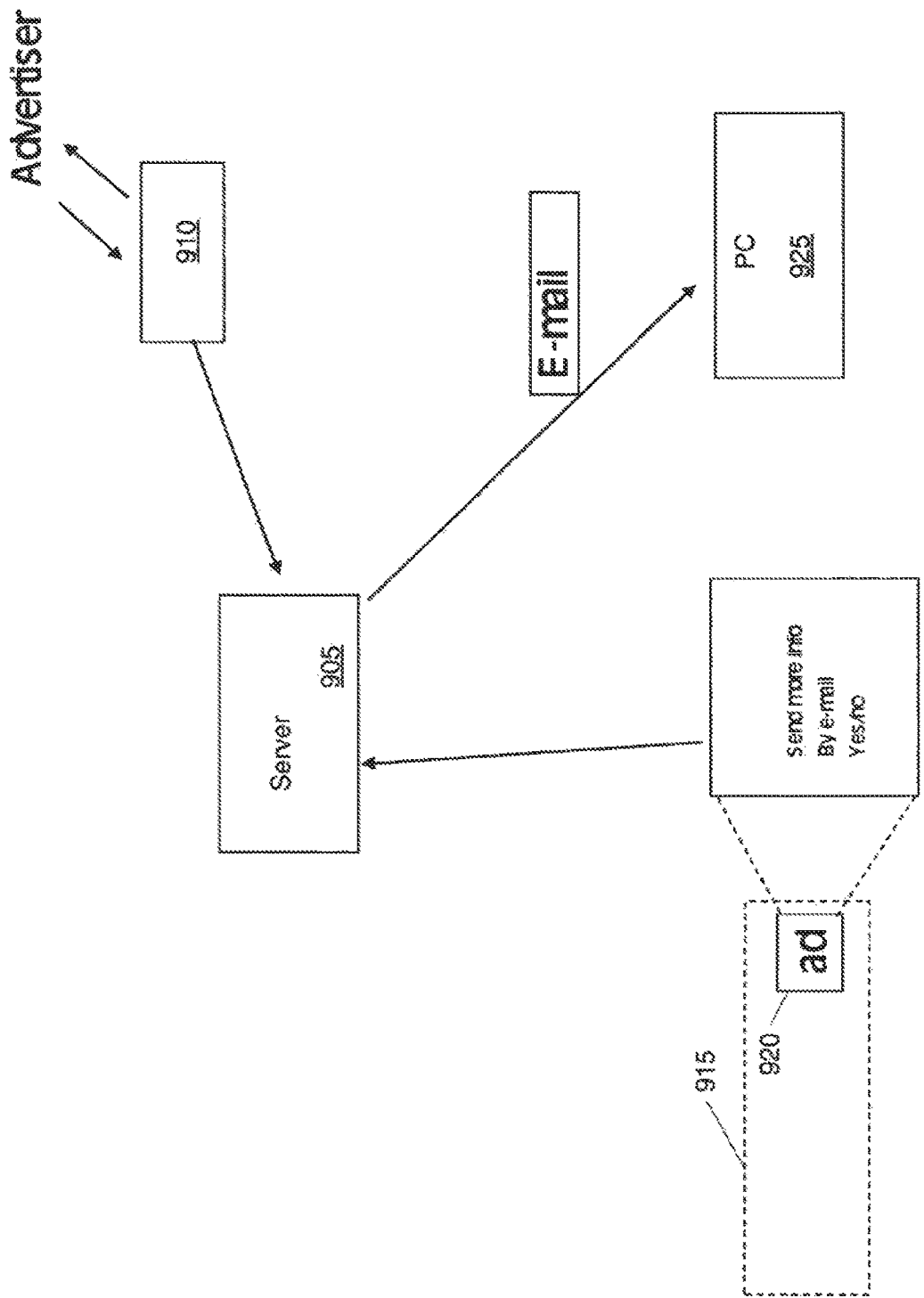
FIG. 9 is a block diagram illustrating a process of requesting and receiving additional information associated with an advertisement according to one or more aspects described herein.

FIG. 9 is a diagram illustrating a system for requesting and receiving additional information based on an advertisement widget. The system includes server 905, advertiser 910, a user device displaying a dashboard 915 and a widget 920. The system further includes a second computing device 925. Using these components, the system allows a user to request additional information without publishing his or her email address or other contact information. The additional information might not be sent to the mobile device displaying widget 920 for a variety of reasons including size constraints and storage capacity. Thus, if the user responds affirmatively to a prompt in widget 920 inquiring whether additional information is available or desired, the additional information may be sent to second computing device 925 and accessed. Since the server 905 facilitates communications between advertiser 910 and a user, server 905 may request the additional information from advertiser 910 anonymously and transmit the retrieved information to device 925 using, for example, a private email address of the user. Server 905 may request the information based on an identification associated with advertisement widget 920. Private contact information of the user may be stored in the user's profile or in a separate database component that contains non-public information. Server 905 may also prompt the user for private contact information if none is available.

Figure 10:
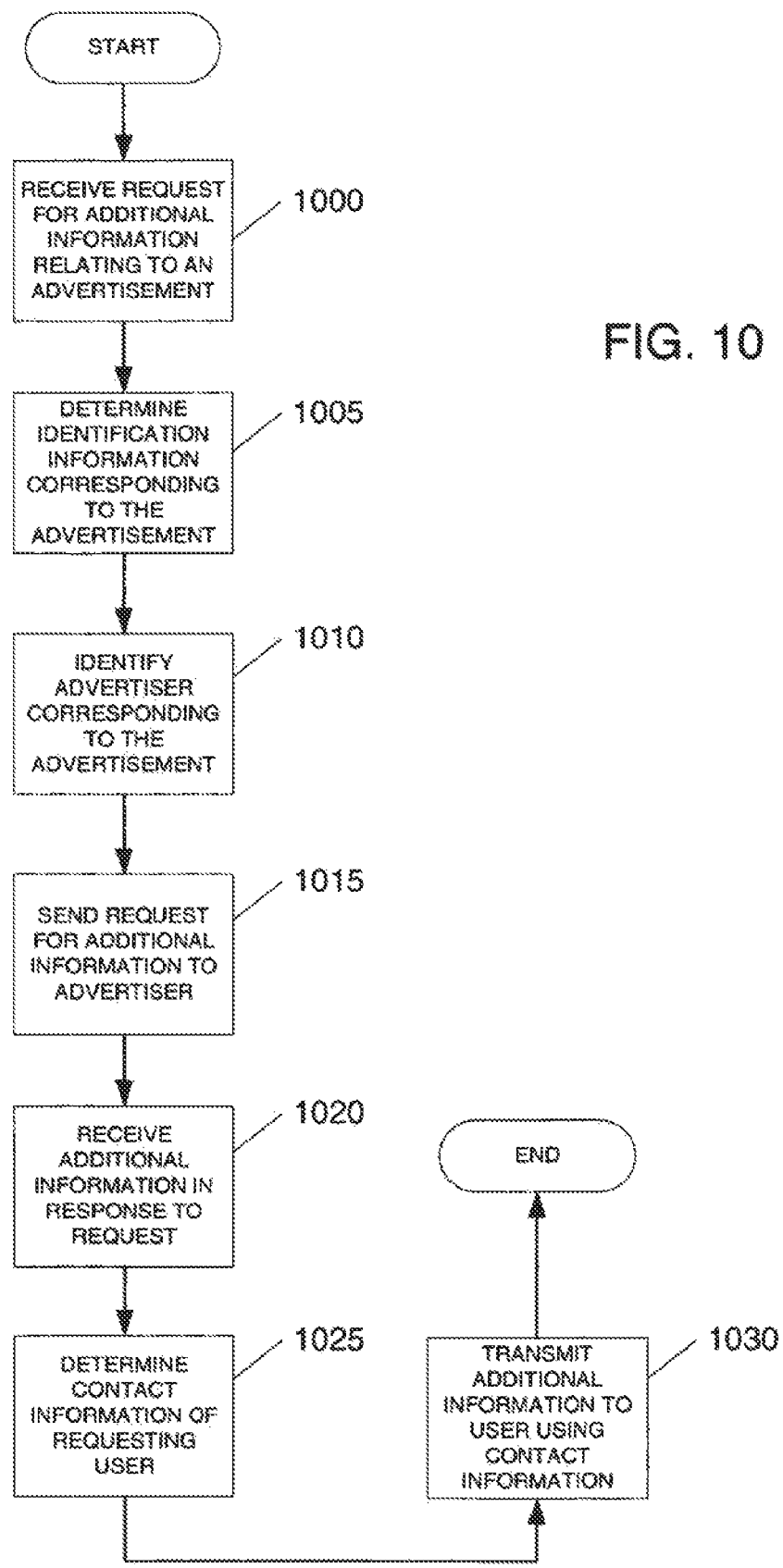
FIG. 10 is a flowchart illustrating a method for handling requests for additional information corresponding to a particular advertisement according to one or more aspects described herein.

FIG. 10 is a flowchart illustrating a method for retrieving requested information and transmitting the requested information to a requesting user. In step 1000, a user's request for additional information relating to an advertisement is received. A user may request the information by selecting an appropriate option in an advertisement or advertisement widget displayed on his or her mobile device. In step 1005, identification information corresponding to the advertisement or advertisement widget is extracted from the request. The identification is used in step 1010 to determine a corresponding advertiser. A request is then sent to the advertiser in step 1015 with the advertisement identification information. In response, additional information related to the specified advertisement is received from the advertiser in step 1020. Upon receiving the additional information, contact information of the requesting user is determined in step 1025. The contact information may refer to a device different from the device on which the user requested the additional information. The user may request the information be sent to this other device due to numerous circumstances including storage capacity, display capabilities and/or software limitations. The contact information may be retrieved from a user profile corresponding to the user or, alternatively, may be manually entered by the user in response to a prompt. Other methods of determining contact information may also be used. In step 1030, the additional information corresponding to the advertisement is transmitted to the user based on the determined contact information. The method may further protect the identity and privacy of a user who does not wish to publish his or her contact information with advertisers.

Figure 11:
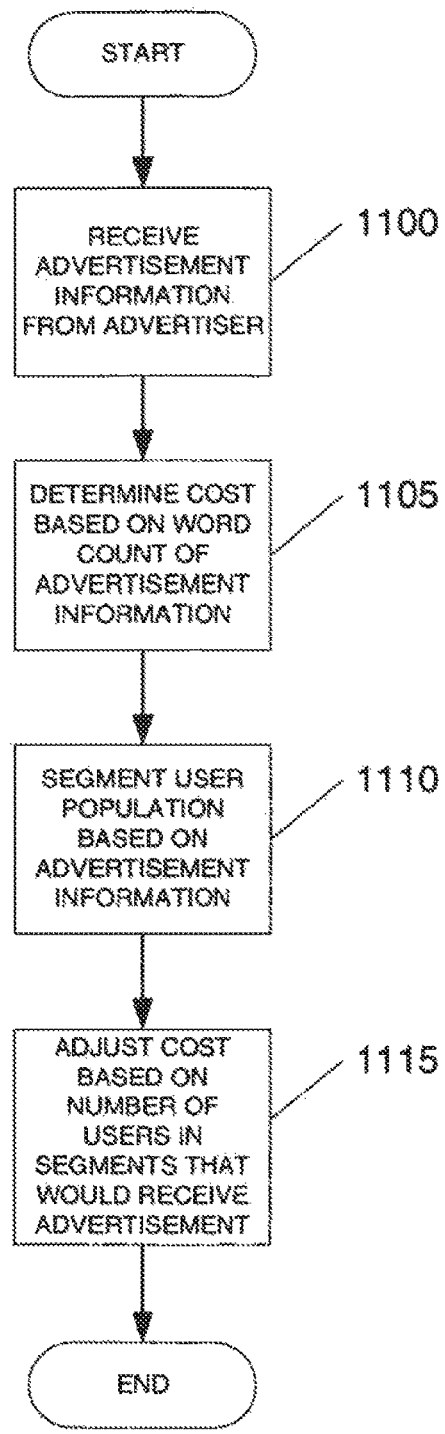
FIG. 11 is a flowchart illustrating a method for providing cost and market permeation estimates to an advertiser prior to submitting the advertisement for publication according to one or more aspects described herein.

FIG. 11 is a flowchart illustrating a method for determining a cost and allocation of an advertisement requested from an advertiser. Determining a cost and allocation of the advertisement allows an advertiser to determine whether the costs are worth the market permeation of the advertisement. For example, if an advertisement would cost an advertiser $200 but would only reach a segment of the user population containing 200 people, an advertiser may decide against publishing the advertisement. However, if the potential market penetration justifies the cost of an advertisement, the user may be more willing to incur the expense.

In step 1100, key words and other information associated with a desired advertisement is received from an advertiser. A preliminary cost is then generated based on multiple factors including a number of words in the advertisement, size of font and whether or not graphics are included, all of which determine a size of the advertisement, in step 1105. Further, in step 1110, the advertisement information is used to segment the user population to determine the potential market permeation of the advertisement. In other words, one or more users of the user population that may have interest are identified. Interest level may be determined based on the user profile of each user. The preliminary cost may then be adjusted based on the number of users that may receive the advertisement in step 1115. For example, a first premium may be added to the cost if between 300 and 500 users will be targeted and a second premium may be applied to the cost if 501 or more users are projected to receive the advertisement. The cost may also be adjusted based on prices being charged for comparable ads targeting the same segment of users. Alternatively or additionally, the cost may be adjusted to maximize the revenue from a given advertisement based on parameters such as a click-through rate and a cost of click. Historical information may be collected and stored to estimate the click-through rate based on various words used in an advertisement. For example, a higher click-through rate may be estimated for the word "books" than for the word "dictionary."

Based on the cost of click and the estimated click-through, a preferred cost may be calculated to maximize total revenue.

Figure 12:
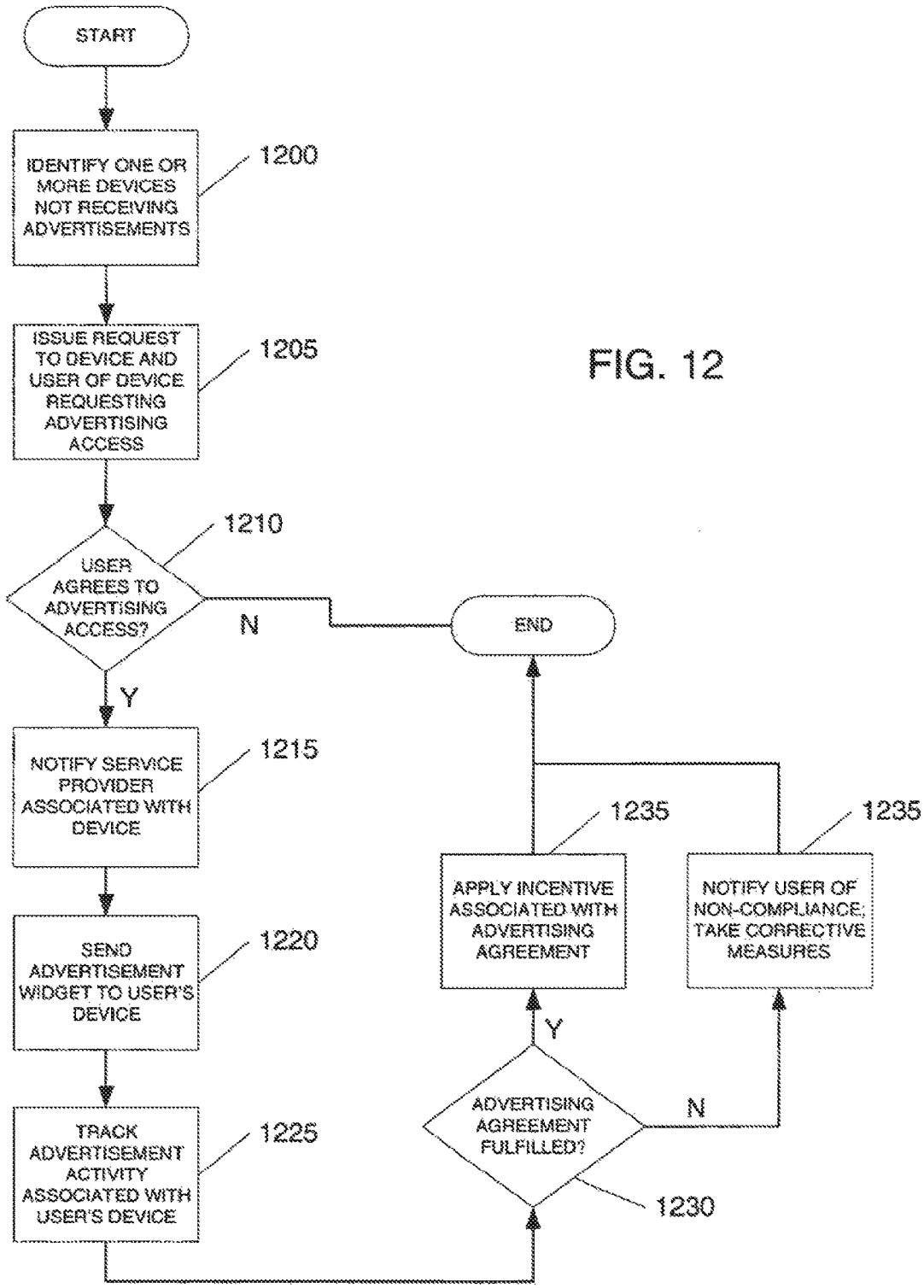
FIG. 12 is a flowchart illustrating a method for obtaining advertising access to a user according to one or more aspects described herein.

FIG. 12 is a flowchart illustrating a method for acquiring advertising rights to a target user's device by providing incentives. In step 1200, an advertisement server identifies one or more devices that are currently unregistered or that are not receiving advertisements. Identifying such devices may include querying a mobile communication service provider to determine the access permissions associated with a particular device. Access permissions or feature settings may be stored in a database associated with the service provider or advertisement server and/or in the device itself. In one or more configurations, a user device may automatically communicate with the advertisement server upon initial startup. As such, when a user first activates his or her mobile communication device, his or her device may notify a specified advertisement server that the device is active and currently unregistered. In step 1205, the server issues a request to the device and the user requesting permission to send the user advertisements or advertisement widgets. The request may further include one or more incentive offers to entice the user to grant the server's request. The request may identify several advertisement plans that would provide the user with mobile service discounts. For example, if the user agrees to allow 10 advertisements to be downloaded to his or her device every day, the server may apply a 20% discount to the user's GPRS service. Other incentives may include free ringtones, bonus airtime and/or access to pay services.

A determination is then made as to whether the user wants to take advantage of the advertisement offers in step 1210. If the user selects an advertisement plan and offer, a mobile service provider may be notified in step 1215. That is, the advertisement server may notify the server that the user has given advertising permission to the server. In addition, the advertisement server may arrange for discounts with the mobile communication service provider. A server may then send an advertisement widget to the user in step 1220. The widget may be a standard advertisement widget used by the server to deliver a variety of advertising information to the user's device. Alternatively or additionally, the advertisement widget may be specific to a particular product or service. In step 1225, the server or the mobile service provider may track the advertisement activity associated with the user and/or user's device. A determination may then be made in step 1230 to determine whether the user's advertisement requirements have been fulfilled in accordance with the advertisement he or she selected. If so, in step 1235, the server applies the appropriate incentive. If the requirements have not been fulfilled, the server may notify the user of noncompliance in step 1240 or, alternatively, automatically take corrective measures to meet the requirements. For example, an advertisement server may begin send more advertisements or advertisement widgets to the user everyday in order to meet a monthly advertisement allowance agreed to by the user.

Figure 13:
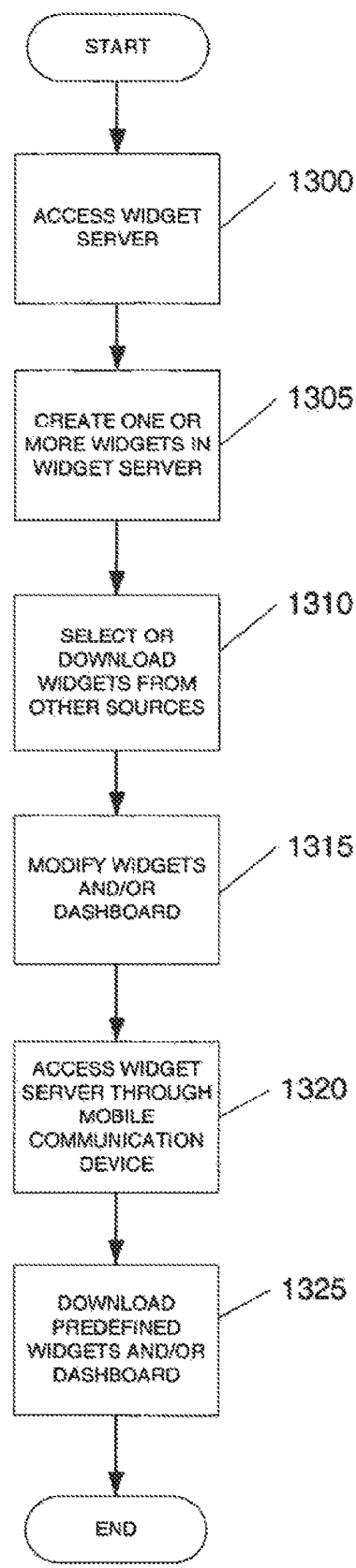
FIG. 13 is a flowchart illustrating a method for creating and accessing widgets and dashboards according to one or more aspects described herein.

FIG. 13 is a flowchart illustrating a method for creating and accessing widgets according to an embodiment. Initially, in step 1300, a user may access a widget server using a variety of access devices. For example, a user may use a personal computer coupled with a broadband network to access the widget server. In step 1305, a user may then create one or more widgets by specifying functionalities and display characteristics. The creation may be facilitated using tools such as YAHOO!® Widget engine. In step 1310, the user may further select or download other widgets that the user would like displayed on his or her mobile communication device. The user may further modify the display features and appearance of a dashboard associated with the widgets or the widgets themselves in step 1315. The user may, for example, adjust the order in which the selected or created widgets are displayed or modify color characteristics of the dashboard. Subsequently, a user may access the widget server using a mobile communication device such as a cellular telephone and download the predefined widgets and/or dashboard in step 1320. Once the dashboard and/or widgets have been downloaded to the user's mobile device, the user may view and manipulate the contents as they please.

One or more systems and methods described herein may be implemented using JAVA applications and functions. In one example, a mobile communications device may run one or more JAVA applications in a sandbox environment. The JAVA applications may facilitate the implementation and distribution of widgets while also coordinating communications. A JAVA function or application may be connected to a server that facilitates incoming and outgoing telephone communications. In particular, the server may aid in establishing network connections between a third party and the user. Further, while the systems and methods described herein have been discussed, in large part, with respect to advertisement widgets and advertising, the systems and methods may also be used with any industry that rely on information distribution and permeation to a specified user population. For example, the systems and methods described herein may be applied to employment listings. In such a setting, the user population may be segmented by various factors including field of interest, college degree and qualifications. An employment listing may then be sent to a segment of the user population that has one or more matching characteristics or attributes.

The methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

The present invention has been described in terms of preferred and exemplary embodiments thereof. Numerous other embodiments, modifications and variations within the scope and spirit of the appended claims will occur to persons of ordinary skill in the art from a review of this disclosure.

That which is claimed:

1. A method for providing advertising information relating to an advertisement, and interactive options to a user, the method comprising:
   causing downloading on a user device via a widget server at least one advertisement widget based on at least one of a user request, user preferences or user operation patterns;
   receiving a request from the user for additional information associated with the advertisement;
   in response to the request, requesting and receiving the additional information from an advertiser of the advertisement; and
   causing transmittal of the additional information to the user.

2. The method of claim 1, wherein the widget server analyzes and records the at least one advertisement widget as part of a user profile.

3. The method of claim 1, wherein the additional information includes a request for an advertisement identification of the advertiser.

4. The method of claim 1, wherein privacy of contact information associated with the user relative to the advertiser is maintained when requesting the additional information.

5. The method of claim 1, further comprising:
   receiving a user selection of an advertisement plan and offer; and
   notifying a service plan provider of the selected advertisement plan and offer.

6. The method of claim 1, further comprising:
   storing access permissions in a database associated with at least one of a service provider or the widget server.

7. The method of claim 1, further comprising:
   tracking advertisement activity associated with the at least one of the user, the user's device, or the advertisement widget.

8. An apparatus for providing advertising information relating to an advertisement, and interactive options to a user, the apparatus comprising at least one processor and at least one memory including computer program code, the at least one memory and the computer program code configured to, with the processor, cause the apparatus to perform at least:
   providing at least one advertisement widget to the user device based on at least one of a user request, user preferences or user operation patterns;
   receiving a request from the user device for additional information associated with the advertisement;
   in response to the request, requesting and receiving the additional information from an advertiser of the advertisement; and
   causing transmittal of the additional information to the user device.

9. The apparatus of claim 8, wherein the at least one memory and the computer program code are further configured to perform at least:
   analyzing and recording the at least one advertisement widget as part of a user profile.

10. The apparatus of claim 8, wherein the additional information includes a request for an advertisement identification of the advertiser.

11. The apparatus of claim 8, wherein privacy of contact information associated with the user relative to the advertiser is maintained when requesting the additional information.

12. The apparatus of claim 8, wherein the at least one memory and the computer program code are further configured to perform at least:
   receiving a user selection of an advertisement plan and offer; and
   notifying a service plan provider of the selected advertisement plan and offer.

13. The apparatus of claim 8, wherein the at least one memory and the computer program code are further configured to perform at least:
   storing access permissions in a database associated with at least one of a service provider or the apparatus.

14. The apparatus of claim 8, wherein the at least one memory and the computer program code are further configured to perform at least:
   tracking advertisement activity associated with the at least one of the user, the user's device, or the advertisement widget.

15. An apparatus for providing advertising information relating to an advertisement, and interactive options to a user, the apparatus comprising at least one processor and at least one memory including computer program code, the at least one memory and the computer program code configured to, with the processor, cause the apparatus to perform at least:
   receiving at least one advertisement widget from a widget server and based on at least one of a user request, user preferences or user operation patterns;
   causing transmittal of a request to the widget server for additional information associated with the advertisement; and
   receiving the additional information on the apparatus, wherein the additional information is requested by the widget server from an advertiser of the advertisement.

16. The apparatus of claim 15, wherein the at least one memory and the computer program code are further configured to perform at least:
   analyzing and recording the at least one advertisement widget as part of a user profile.

17. The apparatus of claim 15, wherein the additional information includes a request for an advertisement identification of the advertiser.

18. The apparatus of claim 15, wherein the at least one memory and the computer program code are further configured to perform at least:

receiving a user selection of an advertisement plan and offer; and causing transmittal of the selected advertisement plan and offer to a service plan provider.

19. The apparatus of claim 15, wherein the at least one memory and the computer program code are further configured to perform at least:

tracking advertisement activity of the apparatus; and causing transmittal of the tracked advertisement activity to the widget server.

20. The apparatus of claim 15, wherein the advertisement widget is identified based on an attribute of the apparatus or user of the apparatus.

* * * * *